Figure 1:
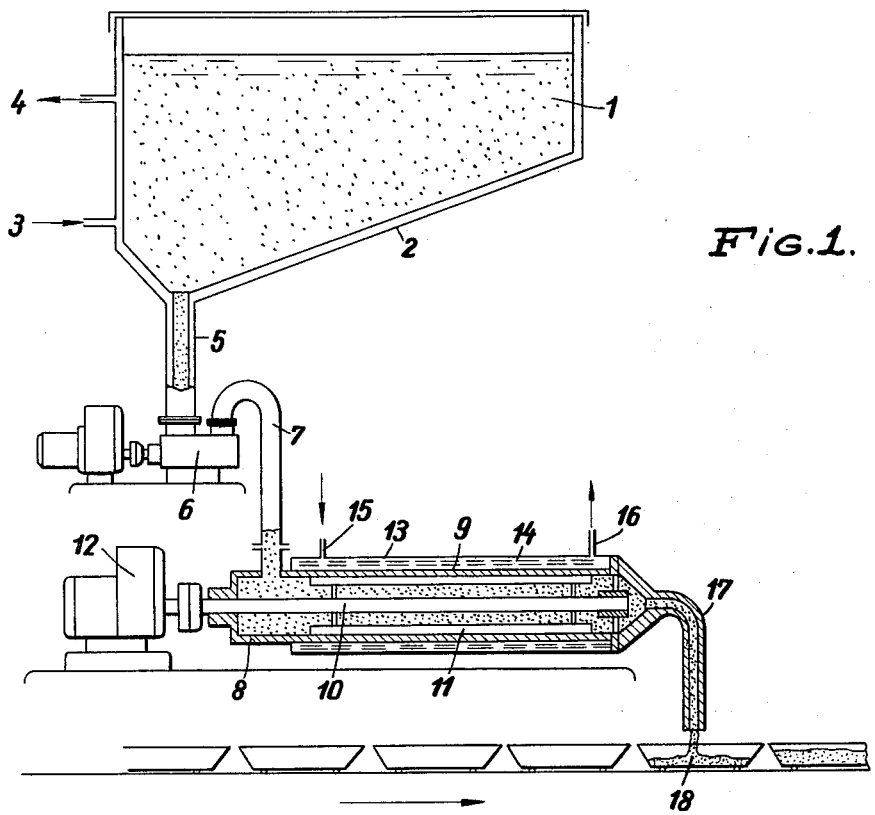

United States Patent Office 3,229,647
Patented Jan. 18, 1966

3,229,647
METHOD AND DEVICE FOR PROCESSING CHOCOLATE MASSES
Heinrich-Jurgen Freiherr Von Drachenfels, Hannover-Bothfeld, and Ernstgeorg Hanssen, Hannover, Germany, assignors to Werner Bahlsen, Hannover, Germany
Filed Mar. 5, 1962, Ser. No. 177,676
Claims priority, application Germany, Mar. 2, 1962, B 66,184
5 Claims. (Cl. 107—54)

This invention relates to a method of processing cholocate compositions, masses and coatings, comprising a step in which the preheated mass, which is capable of flowing, is subjected in a storage container to a cooling process, in order to produce fat crystals.

A method of processing cholocate masses has been known, in which the liquid cholocate mass treated in the longitudinal grinder (conche) is kept in a storage container at a desired temperature at a temperature level of 45 to 55° C. and is then introduced into a temperature regulating machine in which it is cooled to a temperature of 29° C. with simultaneous stirring of the mass. In this cooling step fat crystals are formed which are necessary for the later appearing good gloss of the cooled chocolate mass. The chocolate mass is now transported by a pump, with simultaneous warming to about 32° C. through heated tubes to the processing machines. The increase of temperature to 32° C. is necessary in order to maintain the flowing capacity required for transportation. A very great portion of the fat crystals remains unchanged during this increase of temperature. The cholocate mass cast into molds at 32° C. or applied as a coating is subsequently cooled in a cooling system until it becomes solid.

Chocolate products produced according to this known process take up often a gray color, which does not affect the quality and the taste, which, however, is undesirable in view of the appearance of the chocolate products. It is, therefore, desirable to prepare a cholocate coating or pieces of cholocate, the surface of which remains smooth and glossy even during prolonged storage and under changing climatic conditions.

The appearance of the surface is essentially dependent upon the oozing out of the fat present in the chocolate mass. Of the fat present in the chocolate mass, so-called fat-bloom coatings are formed which cause the originally smooth surface to appear dull gray. A great part of the fat ingredients is present in crystallized condition in the cholocate mass. The formation of the fat-bloom is influenced by the size of the fat crystals. In the case of small fat crystals the formation of fat-bloom is largely avoided.

It has now been surprisingly found that the fat crystals present in the chocolate mass can be kept during casting or the coating process at a size which prevents bloom-formation if the mass is undercooled in a compression cooler with vigorous mechanical movement thereby maintaining its flowing capacity and is passed in this condition into molds or onto the surface of biscuits, candies or the like to be coated. Due to the undercooling, the mass solidifies within a short period of time after introduction into the molds or after application to the biscuits, candies and the like, without the necessity of using an additional cooling system. Thereby only small fat crystals are formed, which cause the formation of a good gloss on the surface and have simultaneously the effect of preventing fat-bloom-formation.

According to a preferred embodiment of the process of the invention the mass which is preheated to about 60° C. is undercooled to about 21–25° C. depending upon the kind of cholocate or coating used (milk cholocate preferably about 22° C., normal cholocate about 24° C.).

Thus, in automatic production, in which e.g. pieces of biscuits, candies and the like are coated with cholocate, the so-called cooling tunnel can be omitted, while in the known process an additional cooling of the cast chocolate mass in a separate cooling system is necessary.

The process of this invention can be carried out by means of a device which comprises a storage container, a heated pipeline, a pump, and an additional heated pipeline and which is distinguished from the known devices by a compression cooler provided with rotating wiping off ledges and an exit nozzle.

According to a preferred embodiment, the wiping off ledges arranged on a shaft lie against the periphery of the cylinder jacket of the compression cooler.

According to a special feature of the invention, the compression cooler has an interior jacket and a spaced outer jacket, the intermediate space between the jackets being used for housing the cooling agent.

Figure 2:
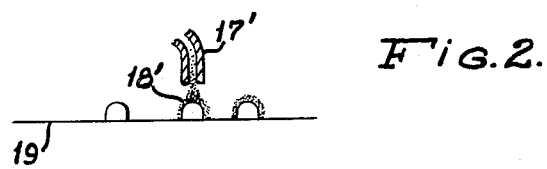

In the accompanying drawing, FIGURE 1 shows, by way of example, a device for carrying out one manner of the process of this invention, wherein molds are filled and FIGURE 2 shows a modified process (using the device of FIGURE 1) wherein articles of any nature are coated.

Referring to FIGURE 1, the chocolate mass 1, which has been treated in a longitudinal grinder (conche) is kept in a storage container 2 at a temperature about 60° C. This container has a double-walled jacket, through the intermediate space of which e.g. heated water of suitable temperature is passed by the feed pipe 3 and discharge pipe 4. It will be understood that heating of the chocolate mass in container 2 can be carried out also in other suitable manner. From storage container 2 the chocolate mass is introduced through a heated tube 5 into pump 6 and over a further heated tube 7 into the compression cooler 8.

The compression cooler consist essentially of a cooled cylindrical jacket 9, in which wiping off ledges 11, which are fastened to a shaft 10, are rotating. The wiping off ledges are so arranged that they lie against the periphery of the cylinder jacket. In the device shown in the drawing, the shaft is driven, by way of example, by a geared motor 12. In order to cool the jacket 9 salt water 14 can be used. Around the jacket 9 a second jacket 13 spaced from jacket 9 is arranged and the cooling salt water 14 is caused to pass through the intermediate space between the two jackets, by feeding it through feed pipe 15 and discharging it through discharge pipe 16. Other media, e.g., water of suitably adjusted temperature can be also used as cooling medium. In the device shown in the drawing the outlet or discharge member consists of a nozzle 17, from which the chocolate mass is introduced into containers 18 which pass below the nozzle 17.

During passage of the chocolate mass between the entry 7 into the compression cooler and the nozzle or mouthpiece 17 the chocolate mass is cooled up to about 21–25° C. i.e. it is brought to a condition, in which it would solidify under normal conditions. However, due to the turbulent movement of the chocolate mass, which is brought about by the rotating movement of the wipe off ledges, the mass retains its flowing capacity. In addition, the wiping off members constantly remove crystallizing chocolate particles from the interior surface of cylinder jacket 9. These wiped off crystals form crystal seeds for the mass. Upon discharge of the chocolate from nozzle 17 into container 18, the mass immediately solidifies with simultaneous formation of an enormous amount of very small fat crystals and this takes place homogeneously throughout the entire poured out cross-section. This enormous amount of very small fat crystals causes a very great surface of solid fat particles, leaving only a small amount of liquid fat phase. This small amount of liquid fat can not considerably—when cooled under storage conditions—increase the size of the preformed fat crystals.

In the chocolate or coating processed in this manner the fat crystals have such dimensions that no fat bloom formation takes place in the finished product. Products free from fat-bloom-formation are thus obtained without addition to the chocolate mass of foreign fats, i.e. if cacao butter is exclusively used.

The process of the invention can be applied with equal advantage in the preparation of chocolate products of any kind.

In FIGURE 2, articles 18' of any nature are carried by a belt 19 below the discharge nozzle 17' and the discharged chocolate coats the articles.

Tests were carried out according to the process here claimed under the conditions described hereinafter. Thereby the chocolate mass solidified with good gloss on the test pieces. Said conditions were as follows:

Inlet temperature of the chocolate
  mass _____ 55° C.
Outlet temperature of the chocolate
  mass _____ 25° C.
Pressure at the inlet (superatmos-
  pheric pressure) _____ 15–20 atmospheres.
Output of the machine _____ 70–100 kg. per hour.
Solidification time of the coating
  mass discharged with 25° C. ____ 5–6 minutes.

Parallel experiments were carried out on the same day. The test pieces were coated with the same chocolate as above, the temperature of which was regulated in conventional manner. In comparative tests coatings were prepared in the same manner and subsequently carefully cooled in the cooling course. In these parallel experiments no difference whatsover from the normal prior art products could be observed in the coating process.

The products obtained in the above experiments had the following appearance:

| Storage time | Test pieces (process claimed) | Products of parallel experiments (prior art) |
| --- | --- | --- |
| 18 days | Glossy | Beginning fat-bloom-formation. |
| 32 days | ____do____ | Fat-rime. |
| 46 days | ____do____ | Do. |
| 60 days | ____do____ | Do. |
| 74 days | ____do____ | Do. |
| 88 days | ____do____ | Do. |

What is claimed is:

1. A method of processing chocolate masses, comprising subjecting to undercooling in contact with a cooling surface to 21–25° C. a preheated chocolate mass containing fat ingredients while vigorously stirring the mass and thereby causing turbulent movement of said mass to maintain its flowing capacity and simultaneously seeding said mass while maintaining said mass at said temperature by removal of congealed chocolate particles from the cooling surface and then substantially immediately conducting said chocolate mass to an article and then allowing it to solidify on the article without further cooling or heating.

2. A method as claimed in claim 1, in which the undercooled mass is filled into molds and allowed to solidify without further cooling.

3. A device for processing chocolate masses comprising a heatable storage container, a pump and a first heatable tubing connecting said container with said pump, a compression cooler having a cooling jacket provided with an inner cooling surface for cooling a chocolate mass to a temperature of 21 to 25° C. and having a rotatable shaft, wiping off ledges fastened to said shaft along the axis thereof and extending radially therefrom and having outer edges in wiping contact with the entire inner surface of the jacket, said ledges vigorously stirring the mass in the cooler and causing turbulent movement of the mass and simultaneously seeding the mass by removal of congealed chocolate particles from said inner surface, a heatable tubing connecting said pump with said compression cooler to pressurize the chocolate mass in said cooler and an outlet nozzle for discharging the cooled chocolate mass from the compression cooler continuously under the pressure created by said pump at said temperature.

4. A device as claimed in claim 3, in which the compression cooler contains an inner jacket having the inner surface conducted by the ledges and an outer jacket spaced from the inner jacket, the intermediate space between the interior and outer jacket being adapted to receive a cooling medium flowing through the cooler.

5. A method as claimed in claim 1, in which the undercooled mass is deposited on an article to coat it and allowed to solidify without further cooling.

References Cited by the Examiner

UNITED STATES PATENTS

| | | | |
| --- | --- | --- | --- |
| 1,605,951 | 11/1926 | Hollstein et al. | 107—8.4 |
| 2,255,986 | 9/1941 | Rapisarda | 99—236 X |
| 2,313,705 | 3/1943 | Jack | 99—236 |
| 2,370,920 | 3/1945 | Schaub | 62—342 X |
| 2,588,277 | 3/1952 | Neergaard et al. | 99—236 X |
| 2,784,095 | 3/1954 | Meagher | 99—236 X |
| 3,021,779 | 2/1962 | Sollich | 99—236 |

WALTER A. SCHEEL, *Primary Examiner.*

JOSEPH D. SEERS, CHARLES WILLMUTH, ROBERT E. PULFREY, *Examiners.*